United States Patent [19]
Balzer et al.

[11] Patent Number: 4,478,281
[45] Date of Patent: * Oct. 23, 1984

[54] PROCESS FOR EXTRACTING OIL FROM A SUBTERRANEAN RESERVOIR

[75] Inventors: Dieter Balzer; Kurt Kosswig, both of Marl, Fed. Rep. of Germany

[73] Assignee: Chemische Werke Huels, A.G., Marl, Fed. Rep. of Germany

[*] Notice: The portion of the term of this patent subsequent to Jul. 3, 2001 has been disclaimed.

[21] Appl. No.: 300,427

[22] Filed: Sep. 9, 1981

[30] Foreign Application Priority Data

Sep. 10, 1980 [DE] Fed. Rep. of Germany ....... 3033926

[51] Int. Cl.³ .............................................. E21B 43/22
[52] U.S. Cl. .................................... 166/274; 166/273; 252/8.55 D
[58] Field of Search ................... 252/8.55 D; 166/274, 166/275, 273

[56] References Cited

U.S. PATENT DOCUMENTS

| | | | |
|---|---|---|---|
| 2,233,381 | 2/1941 | DeGroote et al. | 252/8.55 |
| 4,110,228 | 8/1978 | Tyler et al. | 166/275 X |
| 4,265,308 | 5/1981 | Hedges et al. | 166/274 |
| 4,293,428 | 10/1981 | Gale et al. | 252/8.55 |

OTHER PUBLICATIONS

Lepper, "Erdoel Ergas Zeitschrift" 92: 426, (1976).
Balzer et al., Tenside Detergents 16:256, (1979).

Primary Examiner—Herbert B. Guynn
Attorney, Agent, or Firm—Millen & White

[57] ABSTRACT

A process for recovering extensively emulsion-free oil from a subterranean deposit of medium or high salinity comprises forcing into an injection well a 1–20% strength solution or dispersion in formation water of a carboxymethylated ethoxylate tenside of the formula:

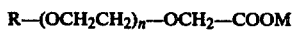

$$R-(OCH_2CH_2)_n-OCH_2-COOM$$

wherein
R is a linear or branched aliphatic residue of 4–20 carbon atoms or a mono- or dialkylaromatic residue of 1–14 carbon atoms in the alkyl group,
n is 3–30, and
M is an alkali or alkaline earth metal ion or ammonium, and wherein the degree of carboxymethylation is incomplete, wherein the tenside is selected so that the phase inversion temperature of the system: crude oil/formation water/tenside/optional additives, lies 0°–10° C. above the deposit temperature.

9 Claims, 2 Drawing Figures

PROCESS FOR EXTRACTING OIL FROM A SUBTERRANEAN RESERVOIR

CROSS REFERENCE TO RELATED APPLICATION

This application is related to Ser. No. 300,547, filed on even date, and whose entire disclosure is incorporated by reference herein.

BACKGROUND OF THE INVENTION

The present invention relates to a process for oil recovery by tenside flooding.

In extracting oil from petroleum deposits, usually only a fraction of the originally existing oil can be recovered by primary extraction methods. In these methods, the oil is brought to the surface by harnessing the natural reservoir pressure. In secondary oil recovery, water is forced into one or several injection wells of the formation and the oil is forced to one or several production wells and thereafter brought to the surface. This so-called water flooding is a relatively inexpensive secondary measure; accordingly, it is utilized frequently. However, in many cases it results in only a minor additional oil extraction from the deposit.

Effective displacement of such oil, which, though more expensive, is urgently required from the viewpoint of the national and international economy in view of the present petroleum scarcity, is accomplished by tertiary measures. These include processes wherein the viscosity of the oil is reduced and/or the viscosity of the flooding water is increased and/or the surface tension between water and oil is decreased.

Most of these processes can be classified as solution flooding or mixture flooding, thermal oil recovery methods, tenside or polymer flooding and/or as a combination of several of the aforementioned processes.

Thermal recovery methods involve injection of steam or hot water, or they take place as an in situ combination. Solution or mixture processes involve injection of a gaseous and/or liquid solvent for the petroleum into the deposit.

Tenside flooding processes, depending on tenside concentration, optionally, on the type of tenside, and on the additives used, are differentiated as tenside-supported water flooding, the usual tenside flooding (low-tension flooding), micellar flooding, or emulsion flooding. These processes are based primarily on a strong reduction of the surface tension between the oil and the flooding water. However, in some instances, especially in the presence of relatively high tenside concentrations, water-in-oil dispersions are produced. These have a markedly increased viscosity as compared with the oil. Tenside flooding processes, then, generally are aimed toward a reduction of the mobility ratio whereby the degree of efficiency of oil displacement is raised.

Genuine polymer flooding is predominantly based on the last-mentioned effect of a more favorable mobility ratio between oil and flooding water.

Heretofore, organic sulfonates, such as alkyl, alkylaryl, or petroleum sulfonates, have been used above all as the oil-mobilizing tensides. However, these compounds exhibit a very low tolerance limit with respect to the salinity of the water present in the deposits. Salt concentrations as low as 1,000 ppm are considered problematic. The sensitivity of these tensides against alkaline earth metal ions is especially pronounced. In this connection, about 500 ppm is assumed to be the upper critical limit concentration (U.S. Pat. No. 4,110,228). When these tensides are utilized, precipitation products are formed in the presence of higher salt concentrations. These can plug up the formation. However, since many deposit waters possess substantially higher salinities, e.g. in Northern Germany up to 250,000 ppm, attempts have been made to find other ways to exploit the otherwise readily oil-mobilizing properties of the organic sulfonates also for deposit systems of higher salinity. Organic sulfonates do show a lesser electrolyte sensitivity in mixture with cosurfactants such as alcohols or nonionic tensides, but in such cases their oil-mobilizing effect is severely impaired as well.

In contrast to this group of compounds, alkyl or alkylaryl polyglycol ether sulfates or carboxymethylated alkyl or alkylaryl ethoxylates exhibit good compatibility even with extremely high salinities (e.g. 250,000 ppm) of the deposit waters. Since the oil-mobilizing effect of these tensides is high [H. J. Neumann, "DGMK BERICHTE" [Reports of the German Society for Petroleum Technology and Carbon Technology and Carbon Chemistry], Report 164 (1978); D. Balzer and K. Kosswig, Tenside Detergents 16:256 (1979)], and their manufacture is simple and economical, these classes of compounds are very highly suitable for use in oil displacement in medium- and high-salinity deposit systems (30,000–250,000 ppm total salt content).

In numerous investigations on residual oil mobilization using model formations with carboxymethylated ethoxylates as the tensides, however, it has been observed that the transport of the oil bank through the formation is accompanied by a strong pressure rise. Thus, even with a relatively highly permeable artificial formation, pressure gradients have been observed of up to about 40 bar/m. When applied to field operations, the results show pressures far above the petrostatic pressure, precluding the use of these tensides in tertiary oil recovery.

The literature also makes mention of pressure gradients of a similar magnitude [C. Marx, H. Murtada, M. Burkowsky, "Erdoel Erdgas Zeitschrift" [Petroleum Natural Gas News] 93:303 (1977)]. These authors explain the high pressure differences as a result of the formation of emulsion zones which are said, however, to be limited to the region of the flood front. Experiments, however, have not shown any local limitation of the pressure gradient. Inasmuch as crude oil emulsions stabilized by carboxymethylated ethoxylates are structurally viscous, the high pressure differences cannot be reduced at will by decreasing the flooding rate, either. Consequently, uncontrollably high pressure gradients must be expected in field experiments of tenside flooding with carboxymethylated ethoxylates.

Therefore, it is important to find a mode of operation for tenside flooding for the readily oil-mobilizing, carboxymethylated ethoxylates which does not lead to high pressure gradients. One way of lowering the pressure gradient is to attempt greatly delayed tenside breakthrough by a suitable adaptation of the quantity of tenside added to the deposit. However, this procedure presupposes homogeneous formations. These occur in artificial sand accumulations but hardly in actual reservoirs (deposits). Therefore, it is not possible to solve the problem in this way.

SUMMARY OF THE INVENTION

Accordingly, it is an object of the invention to provide a process for utilizing the carboxymethylated ethoxylates in tenside flooding while minimizing the mentioned pressure gradient buildup.

Upon further study of the specification and appended claims, further objects and advantages of this invention will become apparent to those skilled in the art.

These objects have been attained by providing a process for recovering extensively emulsion-free oil from a subterranean deposit of medium or high salinity by forcing into an injection well a 1–20% strength solution or dispersion in formation water of a carboxymethylated ethoxylate tenside of the formula:

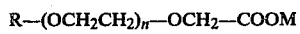

wherein

R is a linear or branched aliphatic residue of 4–20 carbon atoms or an alkylaromatic residue of 1–14 carbon atoms in the alkyl group, n is 3–30, and M is an alkali or alkaline earth metal ion or ammonium, and wherein the degree of carboxymethylation is imcomplete, wherein the tenside is selected so that the phase inversion temperature of the system: crude oil/formation water/tenside optional additives, lies 0°–10° C. preferably 1°–5° C. above the deposit temperature.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DISCUSSION

Figure 1:
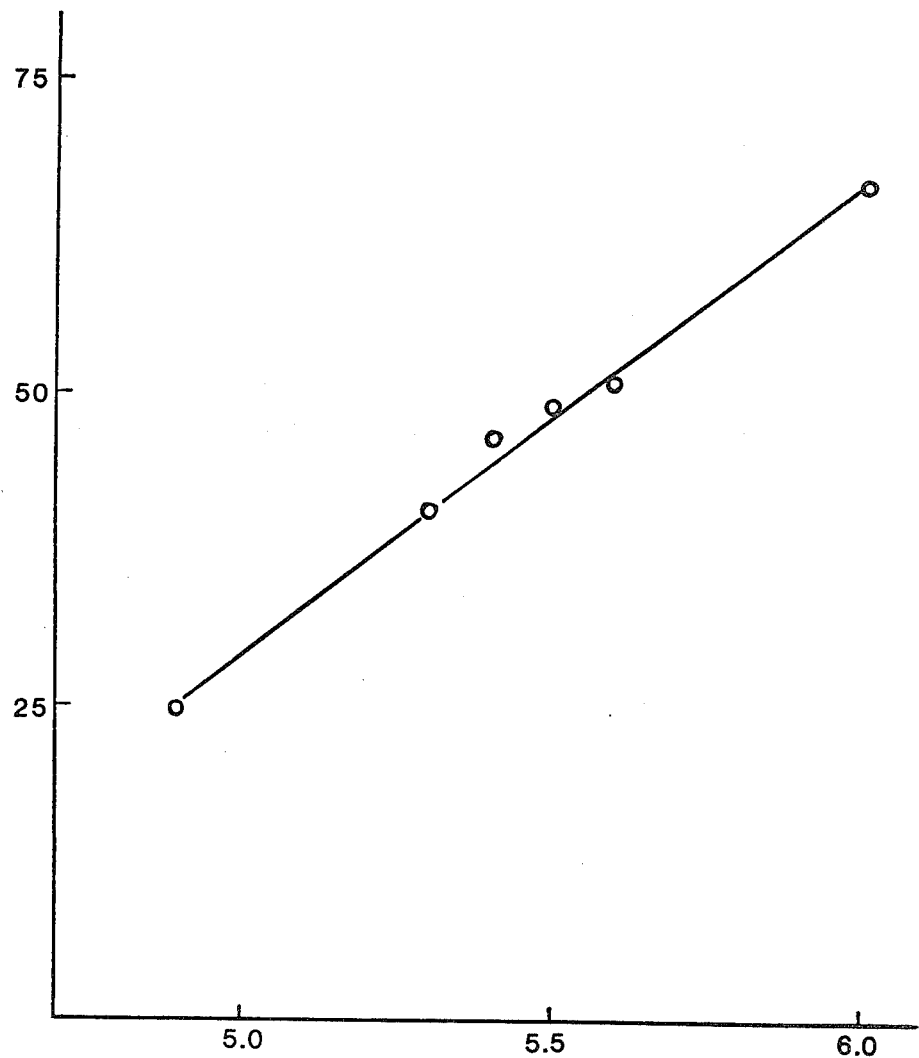
FIG. 1 shows the functional dependence of the phase inversion temperature on the degree of ethoxylation.

The problem to which this invention is directed has been solved, surprisingly, by abandoning a conventional working hypothesis expounded in the literature. According to this theory, effective residual oil extraction is possible only if the conditions for the existance of a W/O emulsion (water-in-oil emulsion) are present to the utmost during the entire flooding process [U. Lepper, "Erdoel Erdgas Zeitschrift" 92:426 (1976)]. According to D. Balzer and K. Kosswig, Tenside Detergents 16:256 (1979), this means that the phase inversion temperature (PIT) of the system—original crude oil-/original formation water/tenside/optional additives—must lie markedly below the deposit temperature, namely up to 15° C. below it. In flooding experiments conducted under these conditions on model formations, very effective oil extractions were ordinarily observed. The crude oil could be flooded out quite predominantly free of emulsion. However, high pressure gradients very frequently occur in this mode of operation.

It has now been found that the pressure gradient can be lowered 20 to 100 times by this invention with simultaneous satisfactory oil extraction. This is extremely surprising since the required temperature range is the phase range of an O/W emulsion. Furthermore, if a tenside is selected having a PIT around 11° C. or more above the deposit temperature, and, thus, the phase range of an O/W emulsion prevails, ineffective mobilizing of the residual oil results, and the oil is transported quite predominantly as an emulsion.

The PIT proper is conventionally determined by measuring electric conductivity. For this purpose, an emulsion consisting of the crude oil and the formation water of the respective deposit (phase ratio 1:1), and the tenside (2%, based on the aqueous phase), as well as any optional additives, is prepared, and its electric conductivity is measured as a function of the temperature. At the PIT, an O/W emulsion changes over into a W/O emulsion, and/or vice versa. At this point, the electric conductivity drops or rises in a jump-like fashion. Accurately speaking, this is a temperature range of a few degrees Celsius. The temperature is recorded as the PIT at which the electric conductivity reaches the mean value between the upper (O/W) and the lower (W/O) level.

The present invention involves the use of carboxymethylated ethoxylates as oil-mobilizing tensides. These compounds can be produced according to German Pat. No. 2,418,444 whose disclosure is incorporated by reference herein, by reacting ethoxylates of the formula $R-(O-CH_2-CH_2)_nOH$ with a salt of chloroacetic acid in the presence of an alkali metal hydroxide or an alkaline earth metal hydroxide. However, other conventional preparation methods are likewise suitable.

For this invention, R is a saturated or unsaturated, straight-chain or branched hydrocarbon aliphatic group, such as alkyl, of 4–20, preferably 8–16 carbon atoms, or an alkylaryl residue of 1–14 carbon atoms in the alkyl residue such as alkylphenyl or dialkylphenol. The aryl residue generally has 6–10 carbon atoms.

The symbol n can have a value of 3 to 30, preferably of 3 to 15. Suitable cations M include sodium, potassium, lithium, ammonium, calcium, or magnesium.

Suitable alcohols and phenols, the ethoxylates of which form the basis for the carboxymethylates, include for example: hexyl alcohol, octyl alcohol, nonyl alcohol, decyl alcohol, undecyl, lauryl, tridecyl, myristyl, palmityl, and stearyl alcohols, etc., and also unsaturated alcohols, such as, for example, oleyl alcohol and the like. The alkyl chain can be normal or branched. Commercial mixtures of these alcohols are utilized especially advantageously. Suitable alkyl phenols include for example, ethylphenol, propylphenol, butylphenol, hexylphenol, octylphenol, nonylphenol, decylphenol, undecylphenol, dodecylphenol, tridecylphenol, tetradecylphenol, dibutylphenol, dihexylphenol, etc. The alkyl chain can be normal or branched. Especially suitable are commercially available mixtures of such alkyl phenols.

The ethoxylation can be carried out in the presence of catalytic amounts of the alkali metal or other hydroxide and 3–30, preferably 3–15 moles of ethylene oxide per mole of alcohol. The resultant mixtures have an approximate Poisson distribution.

In correspondence with the way they are manufactured, the carboxymethylated ethoxylates will always contain considerable quantities of unreacted ethoxylate. Consequently, the formula $R-(OCH_2-CH_2)_n-OCH_2-COOM$ refers in all cases to a mixture of such entities with varying amounts of unreacted ethoxylate. Accordingly, a degree of carboxymethylation can be defined. It has been found that mixtures with a carboxymethylation degree of 10% to 90%, preferably 30% to 90%, are effectively capable of displacing the oil. Especially effective are mixtures with degrees of carboxymethylation of 50–85%. The percentage refers to weight percent in all cases.

The aforedescribed mixtures of anionic and nonionic tensides, called carboxymethylated ethoxylates, are soluble or at least readily dispersible in ordinary deposit waters, and no precipitations whatsoever are observed.

The process of this invention can be carried out as follows. With knowledge of the deposit temperature or, optionally, a temperature range, the PIT is measured for purposes of orientation. The measurement system is: crude oil/formation water/in some cases, the gas of the deposit/a carboxymethylated ethoxylate of the above-mentioned formula which appears suitable. This measurement is repeated, if necessary, with other tensides of this class and, optionally, with additives.

On the basis of the measured results, the carboxymethylated ethoxylate is then tailor-made to meet the conditions of this invention; the oil-mobilizing effectiveness of this compound for the deposit system of interest can be verified by one or several preliminary trials using a sand pack as a model formation or using original drilling cores themselves.

The sodium salts, among others, of the carboxymethylated ethoxylates, e.g., produced by reacting ethoxylates with chloroacetic acid in the presence of sodium hydroxide solution, offer several possibilities for performing "molecular architecture" with the aim of achieving a desired phase inversion temperature in a specific system:

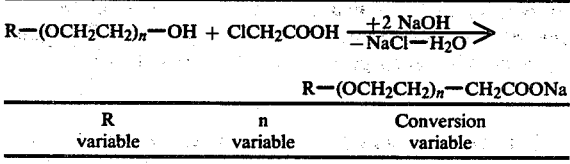

| R | n | Conversion |
|---|---|---|
| variable | variable | variable |

The salts of the carboxymethylated ethoxylates are composed from three variable building blocks: the hydrophobic residue R, the ethoxylate chain, and the carboxymethyl group. The proportion of the latter is variable within wide limits in the thus-obtained product mixture by regulating the conversion of the starting ethoxylate with chloroacetic acid.

Suitable starting materials for the hydrophobic residue R include, for example, linear and branched (fatty) alcohols, or alkyl phenols with any desired alkyl residues. Table 1 indicates the influence of the alkyl residue on the phase inversion temperature in a specific system.

TABLE 1

| Dependency of PIT on the length of the alkyl residue in the sodium salts of carboxymethylated fatty alcohol ethoxylates with 4.4 EO and with a degree of conversion of 65%; crude oil A (see D. Balzer and K. Kosswig, loc. cit.), formation water A (see D. Balzer and K. Kosswig, loc. cit.), phase ratio 1:1, 2% tenside. | |
|---|---|
| C-Number of the Alkyl Residue | PIT (°C.) |
| 12 | 74 |
| 13* | 53 |
| 14 | 41 |

TABLE 1-continued

| Dependency of PIT on the length of the alkyl residue in the sodium salts of carboxymethylated fatty alcohol ethoxylates with 4.4 EO and with a degree of conversion of 65%; crude oil A (see D. Balzer and K. Kosswig, loc. cit.), formation water A (see D. Balzer and K. Kosswig, loc. cit.), phase ratio 1:1, 2% tenside. | |
|---|---|
| C-Number of the Alkyl Residue | PIT (°C.) |
| 16 | 37 |

*1:1 Mixture of $C_{12}$ and $C_{14}$

Figure 2:
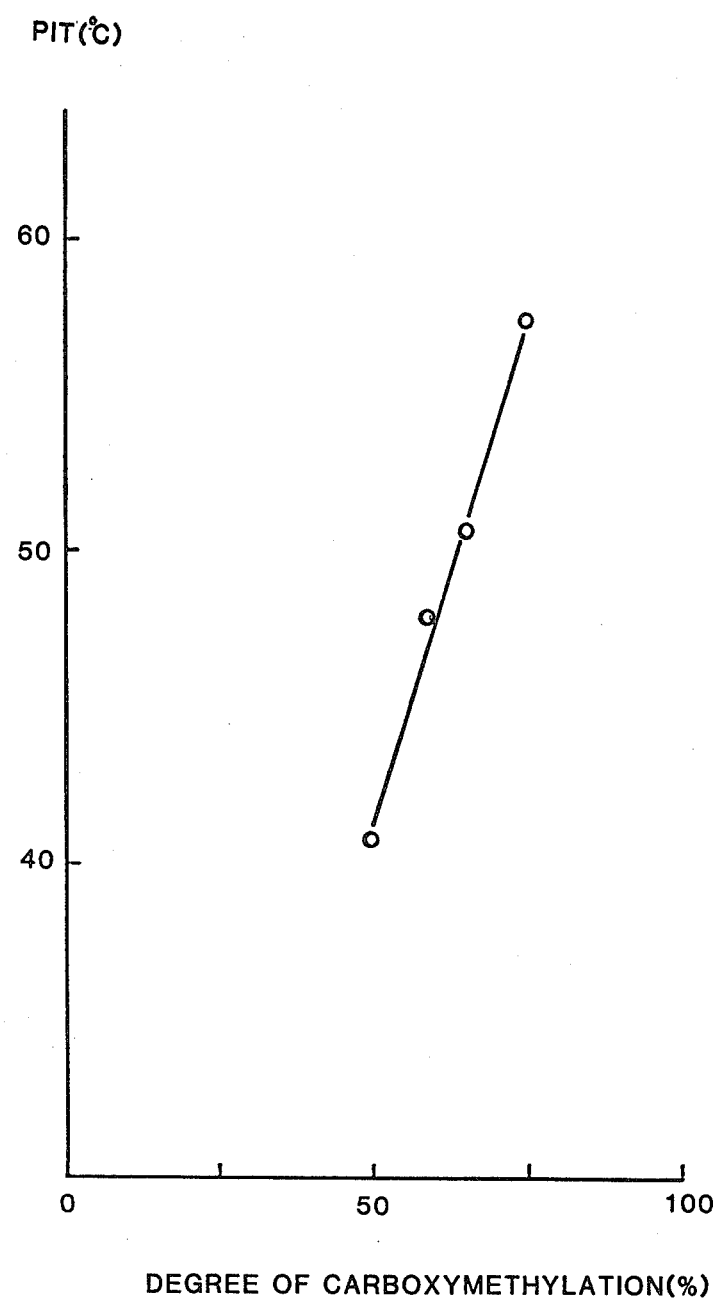
FIG. 2 shows the functional dependence of the phase inversion temperature on the degree of carboxymethylation.

FIGS. 1 and 2 represent the dependencies of the phase inversion temperature in a specific system on the degree of ethoxylation and the conversion.

In both cases, crude oil A and formation water A were used in a phase ratio of 1:1 and 2% tenside. In FIG. 1, the tensides are isononylphenol ethoxylates of various degrees of ethoxylation, carboxymethylated to an extent of 70%, and in FIG. 2, the tensides are isononylphenol ethoxylates reacted to various degrees with chloroacetic acid and containing 5.5 EO.

Table 1 and FIGS. 1 and 2 demonstrate the variability with respect to the deposit conditions afforded by the class of carboxymethylated ethoxylates, which, in the final analysis, are mixtures of ionic and nonionic tensides.

If desired, it is also possible to conventionally optimize the volume of the tenside solution to be injected, its concentration, the possible additives, and the type and size of the mobility-controlling polymer solution, all using, e.g., model flooding experiments. Based on the results of these preliminary trials, the tenside solution is introduced into the deposit using injection pumps. In this connection, the tenside solution can be employed either continuously or in the form of a slug, i.e. a narrowly limited volume of 0.05–4.0 PV (=multiple of the pore volume of the deposit). The size of the slug is dependent above all on the concentration of the tenside solution and on the economics.

The tenside is usually added in the form of a 1–20, preferably 2–10% by weight solution or dispersion in formation water. Like all other conditions, amounts and details of the process of this invention, the amount of tenside solution added is such that under the operating conditions of the invention for a given deposit, the PIT requirements of this invention are met. In general, all aspects of the process of this invention are fully conventional unless noted otherwise herein, and are described for example, in Chem. System Report No. 78-5. Process Evaluation-Research Planning, Enhanced Oil Recovery.

Suitably, water flooding will precede the tenside flooding step, the produced formation water being utilized as the flooding fluid. The size of this water slug is 0.01–4 PV, preferably 0.05–1.0 PV. Following the tenside slug, a polymer slug is suitably injected into the deposit for reasons of mobility control as well as to protect the tenside solution from penetrating formation water. For this purpose, a polymer or a polymer mixture is dissolved in the formation water in such a concentration that the viscosity is 4 to 6 times as high as that of the oil. For deposits having a medium and relatively high salinity (3 to 28 wt. %) biopolymers are especially suitable, such as polysaccharides or celluose derivatives which still possess sufficient viscosity in the presence of the increased salt concentration and do not cause precipitations.

In case of formation water relatively low in alkaline earth metal ions, it may be advantageous to add soluble alkaline earth metal salts to the tenside solution as well as to the preliminarily and subsequently flooded formation water.

Other additives include cosurfactants like mono-, di- or trifunctional alcohols, for example iso-propanol, 1-butanol, n-butanol, tert.-amylalcohol, 2-ethylhexanol, butyldiglycol, butyltriglycol. These additives must be considered when adapting the tenside to the deposit, i.e. when measuring the PIT.

Normal water flooding advantageously follows the injection of the polymer solution. This flooding is contained as long as oil can be economically obtained.

Without further elaboration, it is believed that one skilled in the art can, using the preceding description utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Example 1

For the production of an artifical formation, a thermostatable high-pressure pipe having a length of 70 cm and a diameter of 5 cm, equipped with a temperature measuring device and a manometer, bilaterally sealable by threaded closures with capillary inlet and pressure-maintaining valve outlet, is charged with edge-rounded quartz sand. The sand bulk was then saturated with formation water by means of a high-pressure pump, and the desired temperature was set by thermostat. Permeability was measured and thereafter saturation with crude oil was effected, while simultaneously determining the irreducible water content. At this point in time, water flooding was carried out at a flooding rate of about 9 inch/day. After flooding in about 1.5 PV of formation water, reaching a water cut of 98–100%, the tenside was injected as a slug. The polymer solution (0.4 PV) followed as a slug, as well as about 3.0 PV of formation water. Flooding with tenside, polymer, and subsequently with formation water took place at a flooding rate of about 3 inches/day.

The deposit temperature was 47° C., its pressure was 60 bar, the porosity of the artificial formation was about 47%, its permeability was about 1,200 mD, and its irreducible water content was about 25%.

The formation water contained about 20% NaCl, 0.1% KCl, 1.2% $CaCl_2$, and 0.4% $MgCl_2$. The polymer employed was hydroxyethylcellulose (0.25% dissolved in formation water, viscosity at 25° C. about 60 mPa.s). The crude oil was a paraffin-base oil with $n_D^{20}$ 1.486, $d_{20}$ = 0.863 g/cc and $n_{20}$ 10 mPa.s.

The tenside solution utilized was 0.2 PV of a 6.6% dispersion of carboxymethylated nonylphenol ethoxylate with 5.5 moles of ethylene oxide/mole in formation water. The degree of carboxymethylation was about 70%, the PIT of the respective crude oil emulsion was 48° C.

Water flooding achieved an oil extraction of 75%, which could be raised, after adding another 1.3 PV after the onset of tenside flooding, by 23% to a total oil extraction of 98%. During the transport of the oil bank produced by the tenside, a mean pressure gradient of 0.6 bar/m was measured.

Example 2 (Comparative Example)

Under essentially identical conditions, compounds, and process steps as in Example 1, but at a set deposit temperature of 56° C. (PIT was 48° C. as in Example 1), this comparative example was carried out. By water flooding, an oil extraction of 73% was attained which, after addition of another 1.4 PV after onset of tenside flooding, could be increased to a total oil extraction of 99%. However, a mean pressure gradient of 41 bar/m was measured in this process.

Such a pressure gradient would, if transferred into the field, lead to pressures far above the petrostatic pressure and thus would make use of the tensides in tertiary oil transport impossible.

Example 3

This example was conducted under essentially identical conditions, compounds, and process steps as used in Comparative Example 2 (deposit temperature 56° C.), but with a carboxymethylated nonylphenol ethoxylate with 5.9 moles of ethylene oxide/mole. The PIT was 58° C. The degree of oil extraction after water flooding was 75% and could be raised by subsequent tenside flooding to 99%. The mean pressure gradient had a value of 0.7 bar/m.

Example 4 (Comparative Example)

Under practically identical conditions, compounds, and process steps as in Example 1, this example was conducted, but with a 0.4 PV tenside slug of carboxymethylated fatty alcohol ($C_{12}$–$C_{14}$)-ethoxylate with 4.5 moles of ethylene oxide/mole in 5.5% strength dispersed in formation water (PIT 53° C.) and with a deposit temperature of 56° C. By water flooding, an oil extraction of 77% was accomplished. This could be raised after adding another 1.4 PV by tenside flooding to 99%. The mean pressure gradient rose to 23 bar/m.

Example 5

This example was carried out under the conditions, process steps and compounds used in Comparative Example 4 (PIT 53° C.). The deposit temperature, however, was set at a value of 49° C. in this example. The oil extraction by water flooding was 76%, which by the subsequent tenside flooding rose by another 22%. As compared with Comparative Example 4, a mean pressure gradient of only 0.7 bar/m was measured in this example.

Example 6 (Comparative Example)

This example was conducted under essentially identical conditions, process steps and compounds as set forth in Example 3, but at a deposit temperature of 44° C. (PIT 58° C., i.e. 14° above deposit temperature). The degree of oil extraction after water flooding was 77%. This amount could be raised to 94% by addition of more tenside, in which addition, initially 10% of the tertiary oil was transported emulsion-free and then another 7% in the form of an O/W emulsion. The mean pressure gradient during transportation of the oil bank here was 0.6 bar/m.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for recovering extensively emulsion-free crude oil from a subterranean deposit of medium or high salinity, comprising injecting into an injection well therein, a tenside solution or dispersion in formation water comprising 1–20 wt % of a mixture of 10–90 wt % of ethoxylates of the formula $$R-(OCH_2CH_2)_nOH$$

and 90–10 wt % of carboxymethylated ethoxylates of the formula:

$$R-(OCH_2CH_2)_n-OCH_2-COOM$$

wherein

R is a hydrocarbon aliphatic group of 4–20 carbon atoms or a mono- or dialkylphenyl group of 1–14 carbon atoms in the alkyl group,
n is 3–30, and
M is an alkali or alkaline earth metal ion or ammonium, wherein the tenside is selected so that the phase inversion temperature of the system:crude oil/formation water/tenside, lies 0°–10° C. above the deposit temperature and recovering said extensively emulsion-free crude oil from said deposit.

2. A process of claim 1, wherein the phase inversion temperature of the system:crude oil/formation water/tenside, lies 1°–5° C. above the deposit temperature.

3. A process of claim 1 wherein a mono-, di- or trifunctional alcohol is added to the tenside dispersion or solution as a cosurfactant.

4. A process of claim 1 wherein, prior to injecting the tenside solution or dispersion, 0.01–4 PV of formation water is injected into the deposit.

5. A process of claim 1 wherein, after injection of the tenside solution or dispersion, 0.01–4 PV of formation water is forced into the deposit.

6. A process of claim 5, wherein said formation water forced into said deposit contains a viscosity-raising polymer.

7. A process of claim 1 wherein the tenside mixture contains 30% to 90 wt % of carboxymethylated ethoxylates.

8. A process of claim 1 wherein the tenside mixture contains 50% to 85 wt % of carboxymethylated ethoxylates.

9. A process of claim 1 wherein the phase inversion temperature lies 1°–10° C. above the deposit temperature.

* * * * *